April 19, 1960 — A. F. STAMM — 2,933,331
TRACTOR-TRAILER FIFTH WHEEL CONNECTION
Filed Oct. 8, 1958
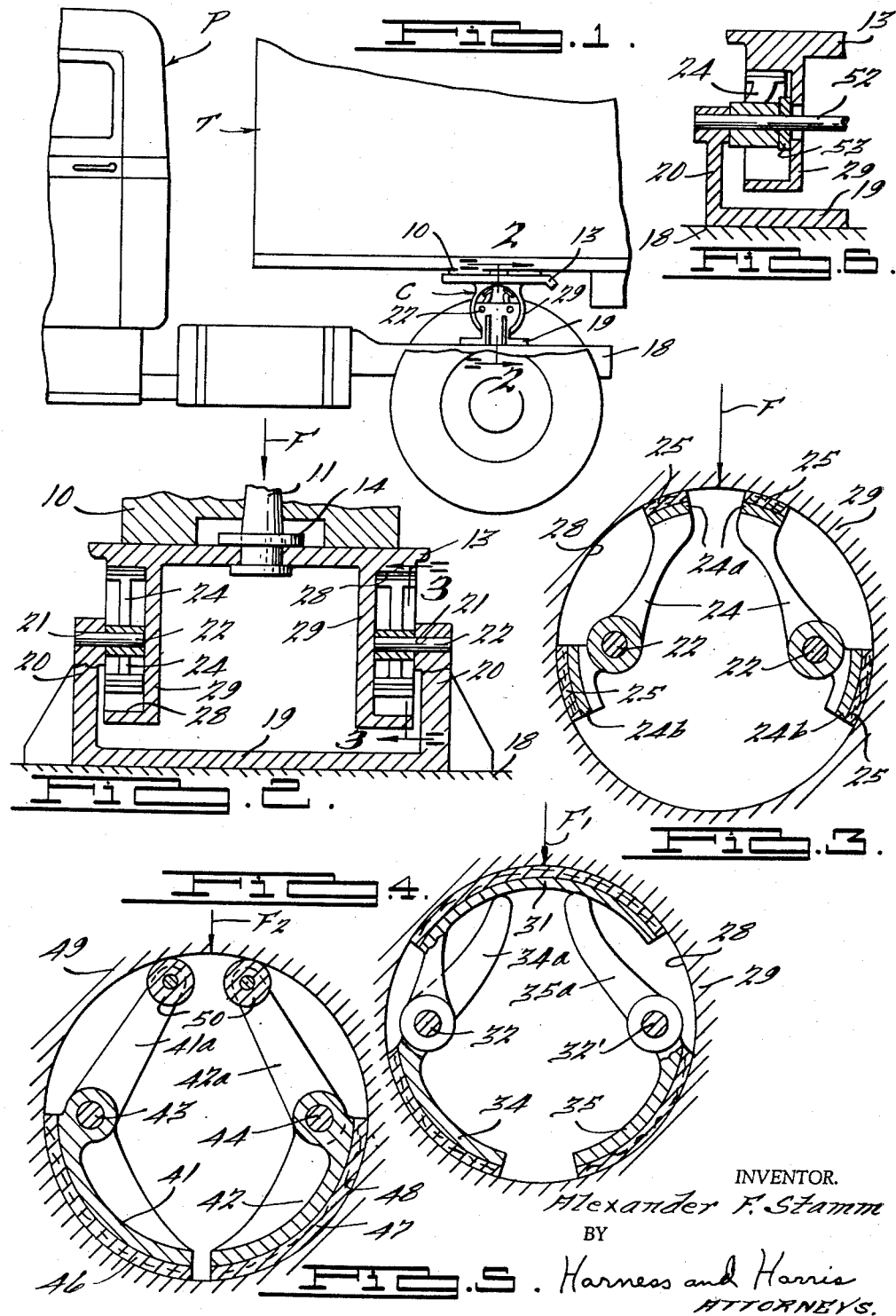
INVENTOR.
Alexander F. Stamm
BY
Harness and Harris
ATTORNEYS.

United States Patent Office 2,933,331
Patented Apr. 19, 1960

2,933,331

TRACTOR-TRAILER FIFTH WHEEL CONNECTION

Alexander F. Stamm, Rochester, Mich., assignor to Chrysler Corporation, Highland Park, Mich., a corporation of Delaware Application October 8, 1958, Serial No. 765,993

8 Claims. (Cl. 280—438)

This invention relates to a tractor-trailer fifth wheel connection and particularly to a fifth wheel connection that will eliminate tractor pitching.

It is a primary object of this invention to provide a fifth wheel connection wherein friction is introduced to rigidify the tow connection between the tractor and trailer and thereby eliminate the tendency of the towed trailer to cause tractor pitching.

It is a further object of this invention to provide a fifth wheel connection wherein friction in proportion to the trailer load on the kingpin is introduced to damp any oscillations or vibrations of the trailer that are liable to be transmitted to the tractor through the fifth wheel connection.

Other objects and advantages of this invention will become readily apparent from a reading of the following description and a consideration of the related drawings wherein:

Fig. 1 is a fragmentary side elevational view of a tractor-trailer combination showing the fifth wheel interconnection therebetween;

Fig. 2 is an enlarged sectional elevational view of a part of the fifth wheel connection shown in Fig. 1, the view being taken along the line 2—2 of Fig. 1;

Fig. 3 is another sectional elevational view of the fifth wheel connection, the view being taken along the line 3—3 of Fig. 2;

Fig. 4 is a sectional elevational view, similar to Fig. 3, showing a second form of this invention;

Fig. 5 is a sectional elevational view, similar to Fig. 3, showing a third form of this invention; and Fig. 6 is a fragmentary sectional elevational view, similar to Fig. 2, showing a modified form of skid plate journal.

In Fig. 1 of the drawing is shown a tractor P connected to a trailer T through a fifth wheel connection C. The fifth wheel connection C comprises a bottom or bearing plate 10 fixed to the underside of the trailer front end that carries a kingpin 11. Kingpin 11 is adapted to be detachably connected to a tractor mounted skid plate 13 through any form of conventional skid plate king-pin locking means that is herein designated by the reference numeral 14. Tractor skid plate 13 has a rearwardly opening, substantially V-shaped, slot therein (not shown) that is adapted to slidably receive the trailer mounted kingpin 11 when the tractor and trailer are to be interconnected.

Now viewing Figs. 1–3 particularly it will be noted that the tractor chassis frame 18 has a cradle-like mounting plate 19 that journals the skid plate 13. Mounting plate 19 has upstanding ears 20 that provide journal bearings 21 for the pivot shafts 22. Pivot shafts 22 support rockably mounted friction shoes 24. Friction shoes 24 have arcuate end portions 24a and 24b that are faced with friction lining segments 25 that are of a material similar to conventional brake lining material. The arcuate, friction faced shoe ends 24a, 24b are arranged within and adapted to be engaged with the interior surface 28 of the cylindrical drum 29 that is formed as an integral portion of the trailer mounted skid plate 13.

From a consideration of Figs. 2 and 3 particularly, it is thought to be clear that the downwardly directed force F, exerted by the load of the trailer T on the tractor P through the fifth wheel connection C, is applied by the skid plate drum surface 28 to the friction shoe portions 24a of the tractor mounted shoes 24. Loading the shoe portions 24a with a downwardly directed force also causes the tractor mounted shoes 24 to rotate about their pivot pin mountings 22 so that the friction shoe portions 24b of the shoes 24 are also forced into tight frictional engagement with portions of the drum surface 28 of the skid plate mounted drum 29. From the geometry of the mounting of the friction shoes 24 it is thought to be obvious that the friction loading of the fifth wheel connection C is directly proportional to the trailer load applied to the tractor P through the fifth wheel connection C.

The disclosed friction loading of the fifth wheel connection C is relied upon to damp vibrations or oscillations that would otherwise be transmitted from the trailer T to the tractor P that would cause pitching of the tractor P. Tractor pitching is disagreeable to the tractor operator, renders control of the tractor more difficult and it also has a detrimental effect on both the tractor and trailer as regards life thereof. The tractor-trailer fifth wheel connection C that is herein disclosed is readily and economically applied to any conventional tractor-trailer unit and it does not adversely effect handling of the tractor-trailer unit in any way whatever. Furthermore, the friction loaded fifth wheel connection C eliminates one of the more troublesome problems that is present in current tractor-trailer operation.

Fig. 4 shows a modified form of this invention wherein three friction shoes are used in each drum unit and wherein the third shoe 31 applies the friction loading force to each of the other two shoes 34, 35. In Fig. 4 the pivot pins 32, 32′ are carried by a tractor mounted cradle in the same manner as shown in Figs. 1–3 for mounting of the pivot pins 22. The tractor mounted skid plate (not shown) carries the spaced pair of drums 29 that each have a drum surface 28. As is shown, the shoes 31 and 34 are each pivoted on the pivot pin 32 whereas the shoe 35 is pivoted on the pivot pin 32′. The trailer applied load F′ acting through drum 29 applies a force to friction shoe 31 that tends to rotate shoe 31 clockwise around pivot pin 32. Rotation of shoe 31 clockwise causes the underside of shoe 31 to engage and depress the lever arms 34a and 35a of the shoes 34, 35 so that shoes 34, 35 will be forced into frictional engagement with the drum surface 28. It will be noted that the Fig. 4 form of the invention includes three shoes with considerably more frictional engagement because of the increased areas of lining contact. It may be found that it is advantageous to provide a symmetrical arrangement when the Fig. 4 form of the invention is used. Accordingly the actuating shoe 31 would be pivoted on pivot pin 32 on one side of the mounting cradle and the corresponding shoe 31 would be pivoted on the pivot pin 32′ on the other side of the cradle. This makes the shoe energization effect symmetrical for both directions of trailer movement. Variation of type of friction lining and length or area of lining surface permits adjustment of the friction damping to meet desired conditions.

Fig. 5 is another form of the invention quite similar to the Fig. 3 form of the invention, but showing a means for removing part of the friction load from the disclosed type of fifth wheel connection. In this form of the invention a pair of shoes 41, 42 are mounted respectively on pivot pins 43, 44 so that their lined faces 46, 47 can be urged into frictional engagement with the drum surface 48 of drum 49. Drum 49 is a part of a skid plate such as the skid plate 13 shown in Figs. 1–3. Lever arms 41a and 42a of the shoes 41, 42 respectively carry rollers 50 on their free outer ends that are adapted to engage the drum surface 48 at the top side thereof. When the trailer applied load $F_2$ acts on drum 49 the lever arms 41a, 42a of the shoes 41, 42 are urged downwardly about their pivot pins 43, 44 respectively and the friction lined shoe surfaces 46, 47 are urged into frictional engagement with the drum surface 48. Mounting of the rollers 50 on the lever arms 41a, 42a reduces the amount of friction that is developed in the fifth wheel connection. Variation in the length of the friction linings 46, 47 is another way of varying the friction load.

In Fig. 6 is shown a slightly modified form of skid plate mounting for a fifth wheel connection embodying this invention. This form of skid plate mounting differs from that shown in Figs. 1–3 essentially in that separate pivot pins, such as the pins 22, have been replaced with a cross shaft 52 that journals the friction shoes on opposite sides of the skid plate. In the Fig. 6 form of the invention washers 53 are mounted on the shaft 52 so as to extend between the friction shoes 24 and the drum 29.

While this invention has been shown as applied to a tractor-trailer fifth wheel connection, still, it is within the scope of this invention as claimed, to apply this invention to any drive transmitting connection between relatively movable members.

I claim:

1. In a tractor-trailer fifth wheel connection, a tractor mounted connector plate, a trailer mounted connector plate, means to detachably connect said plates for the transmission of a tow therebetween, a friction surface mounted on one of said plates, movably mounted friction shoe means on one of said plates arranged such that said shoe means is actuated by said friction surface to be frictionally engaged with said friction surface by a force in proportion to the load applied by one plate member to the other plate member, said frictional engagement of said surface and shoe means acting to damp the transmission of pitching movement between the trailer and tractor.

2. In a tractor-trailer fifth wheel connection, a tractor mounted connector plate, a trailer mounted connector plate, means to detachably connect said plates for the transmission of a tow therebetween, a friction drum mounted on one of said plates, a friction shoe shiftably mounted on one of said plates and arranged to be actuated by and frictionally engaged with said friction drum by a force applied to said shoe by said drum that is proportional to the trailer load applied to said tractor mounted connector plate.

3. In a tractor-trailer fifth wheel connection, a mounting plate adapted to be mounted on a tractor, a skid-plate adapted to be detachably connected to a trailer, means pivotally connecting said skid plate to said mounting plate for oscillation about a substantially horizontal axis extending transversely of the tractor comprising a friction drum mounted on said skid plate, pivot pin means mounted on said mounting plate, and friction shoe means pivotally mounted on said pivot pin means for frictional engagement with said friction drum in proportion to the load applied to the mounting plate by said skid plate.

4. In a tractor-trailer fifth wheel connection, a mounting plate adapted to be mounted on a tractor, a skid-plate adapted to be detachably connected to a trailer, means pivotally connecting said skid plate to said mounting plate for oscillation about a substantially horizontal axis extending transversely of the tractor comprising a friction drum mounted on said skid plate, pivot pin means mounted on said mounting plate, and a plurality of friction shoe means pivotally mounted on said pivot pin means for frictional engagement with said friction drum in proportion to the load applied to the mounting plate by said skid plate.

5. In a tractor-trailer fifth wheel connection, a mounting plate adapted to be mounted on a tractor, a skid-plate adapted to be detachably connected to a trailer, means pivotally connecting said skid plate to said mounting plate for oscillation about a substantially horizontal axis extending transversely of the tractor comprising a friction drum mounted on said skid plate, pivot pin means mounted on said mounting plate, and a pair of friction shoes pivotally mounted on said pivot pin means and arranged within said friction drum, said shoes each having their intermediate portions rockably mounted on said pivot pin means and their opposite end portions frictionally engaged with said friction drum such that loading of said skid plate applies said friction shoe end portions to said friction drum with a friction force proportional to said loading.

6. In a tractor-trailer fifth wheel connection, a mounting plate adapted to be mounted on a tractor, a skid-plate adapted to be detachably connected to a trailer, means pivotally connecting said skid-plate to said mounting plate for oscillation about a substantially horizontal axis extending transversely of the tractor comprising a friction drum mounted on said skid plate, pivot pin means mounted on said mounting plate, and a pair of friction shoes pivotally mounted on said pivot pin means and arranged within said friction drum, said shoes each having their intermedate portions rockably mounted on said pivot pin means with one end portion thereof engaged with said friction drum by friction-free means and the other end portion engaged with the friction drum by friction means, said shoes being arranged within said drum such that the loading of said skid plate applies the shoe friction means to the friction drum with a force proportional to said loading.

7. In a tractor-trailer fifth wheel connection, a mounting plate adapted to be mounted on a tractor, a skid-plate adapted to be detachably connected to a trailer, means pivotally connecting said skid-plate to said mounting plate for oscillation about a substantially horizontal axis extending transversely of the tractor comprising a friction drum mounted on said skid-plate, pivot pin means mounted on said mounting plate, and three friction shoes pivotally mounted within said drum on said pivot pin means with portions of each of said shoes frictionally engaging said friction drum, one of said shoes being arranged within said drum such that movement thereof by said drum about its pivot pin will actuate the other two shoes and apply said other two shoes to said drum with a force directly proportional to the load applied to said skid-plate.

8. In a tow transmitting connection between a pair of fifth wheel connected tractor-trailer members, a first plate adapted to be mounted on one of said members, a second plate adapted to be connected to the other of said members to provide for towing therebetween, means pivotally connecting said plates for relative rotation comprising a friction drum carried by one of said plates, friction shoe means carried by and movably mounted on one of said plates, said shoes being arranged with respect to said friction drum that loading of one of said plates actuates and engages said friction shoe means with said friction drum in direct proportion to the load applied to one plate by the other plate.

References Cited in the file of this patent
UNITED STATES PATENTS

| | | |
|---|---|---|
| 1,852,135 | Thomson | Apr. 5, 1932 |
| 2,718,411 | Geerds | Sept. 20, 1955 |
| 2,777,546 | Kelley | Jan. 15, 1957 |
| 2,809,851 | Beck | Oct. 15, 1957 |